(12) United States Patent
Tomioka et al.

(10) Patent No.: US 9,223,120 B2
(45) Date of Patent: Dec. 29, 2015

(54) IMAGING LENS AND IMAGING APPARATUS (71) Applicant: FUJIFILM CORPORATION, Tokyo (JP)

(72) Inventors: Ukyo Tomioka, Saitama (JP); Michio Cho, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/450,304

(22) Filed: Aug. 4, 2014

(65) Prior Publication Data
US 2014/0340764 A1 Nov. 20, 2014

Related U.S. Application Data (63) Continuation of application No. PCT/JP2013/000573, filed on Feb. 1, 2013.

(30) Foreign Application Priority Data

Feb. 6, 2012 (JP) .................................. 2012-023378

(51) Int. Cl.
*G02B 13/02* (2006.01)
*G02B 15/14* (2006.01)

(52) U.S. Cl.
CPC ................. *G02B 15/14* (2013.01); *G02B 13/02* (2013.01)

(58) Field of Classification Search
CPC ............. G02B 9/62; G02B 9/64; G02B 13/02
USPC .......................... 359/745, 746, 747, 748, 754
See application file for complete search history.

(56) References Cited

U.S. PATENT DOCUMENTS

| 5,325,234 A | 6/1994 | Yoneyama | |
| 2011/0075268 A1* | 3/2011 | Ishibashi | G02B 3/0087 359/652 |
| 2011/0310486 A1 | 12/2011 | Eguchi | |
| 2012/0327289 A1* | 12/2012 | Souma et al. | G02B 13/02 348/345 |

FOREIGN PATENT DOCUMENTS

| JP | 05-297271 | 11/1993 |
| JP | 07-270724 | 10/1995 |
| JP | 08-5906 | 1/1996 |
| JP | 2011-028009 | 2/2011 |
| JP | 2012-002999 | 1/2012 |
| JP | 2012-103375 | 5/2012 |

OTHER PUBLICATIONS

International Search Report—PCT/JP2013/000573—Jun. 11, 2013.

* cited by examiner

*Primary Examiner* — Scott J Sugarman
(74) *Attorney, Agent, or Firm* — Young & Thompson (57) ABSTRACT

An imaging lens includes: a positive first lens group; a positive second lens group which moves while focusing; and a third lens group. The first lens group includes a positive lens having a convex surface with a radius of curvature having a small absolute value toward the image side, a positive biconvex lens, a negative lens having a concave surface with a radius of curvature having a small absolute value toward the object side, and a positive lens having a convex surface with a radius of curvature having a small absolute value toward the object side, in this order from the object side. The second lens group includes a positive lens having a convex surface with a radius of curvature having a small absolute value toward the object side. The third lens group includes two positive lenses and one negative lens. The imaging lens satisfies a predetermined conditional formula.

9 Claims, 10 Drawing Sheets

EXAMPLE 1

FIG.1 EXAMPLE 1

FIG.3 EXAMPLE 3

IMAGING LENS AND IMAGING APPARATUS

CROSS REFERENCE TO RELATED APPLICATIONS

The present application is a Continuation of PCT International Application No. PCT/JP2013/000573 filed on Feb. 1, 2013, which claims priority under 35 USC §119(a) to Japanese Patent Application No. 2012-023378 filed on Feb. 6, 2012. Each of the above applications is hereby expressly incorporated by reference in its entirety, into the present application.

BACKGROUND OF THE INVENTION

1. Technical Field

The present invention is related to an imaging lens and an imaging apparatus. More specifically, the present invention is related to an imaging lens for use in electronic cameras such as digital cameras, broadcast cameras, and cinematic cameras, as well as an imaging apparatus equipped with such an imaging lens.

2. Background Art

A plurality of imaging lenses having angles of view of approximately 10 degrees have been proposed as imaging lenses for use in imaging apparatuses that employ imaging elements such as a CCD (Charge Coupled Device) or a CMOS (Complementary Metal Oxide Semiconductor) as recording media, such as video cameras and electronic still cameras, have been proposed in the past.

For example, Japanese Unexamined Patent Publication No. 5(1993)-297271 proposes an imaging lens having an angle of view of 12.6 degrees and an F number of 2.8. In addition, Japanese Unexamined Patent Publication No. 7(1995)-270724 proposes an imaging lens having an angle of view of 8.4 degrees and an F number of 2.9. Further, Japanese Unexamined Patent Publication No. 8(1996)-005906 proposes an imaging lens having an angle of view of 13.874 degrees and an F number of 2.96.

DISCLOSURE OF THE INVENTION

Small F numbers are required for imaging in low light environments, particularly in cinematic imaging lenses. However, the F numbers of the imaging lenses disclosed in Japanese Unexamined Patent Publication Nos. 5(1993)-297271, 7(1995)-270724, and 8(1996)-005906 are not sufficiently small.

In addition, recently, it is desired for focusing operations to be performed using lightweight lens groups in order to accelerate focusing speed. However, focusing operations are performed by moving two lenses in Japanese Unexamined Patent Publication No. 5(1993)-297271, by moving three lenses in Japanese Unexamined Patent Publication No. 7(1995)-270724, and by moving two lens groups in Japanese Unexamined Patent Publication No. 8(1996)-005906. Therefore, the weight of focusing lens groups is heavy, and it cannot be said that sufficient focusing speed had been achieved.

The present invention has been developed in view of the foregoing circumstances. It is an object of the present invention to provide an imaging lens in which the weight of a focusing group is reduced while also realizing a small F number and high performance. It is another object of the present invention to provide an imaging apparatus equipped with such an imaging lens.

An imaging lens of the present invention substantially consists of:
a first lens group having a positive refractive power which is fixed during focusing operations;
a stop;
a second lens group having a positive refractive power which moves during focusing operations; and
a third lens group which is fixed during focusing operations, provided in this order from the object side;
the first lens group substantially consisting of at least a positive lens 11 having a convex surface with a radius of curvature having a small absolute value toward the image side, a positive biconvex lens 12, a negative lens 13 having a concave surface with a radius of curvature having a small absolute value toward the object side, and a positive lens 14 having a convex surface with a radius of curvature having a small absolute value toward the object side, provided in this order from the object side;
the second lens group substantially consisting of a positive lens 2 having a convex surface with a radius of curvature having a small absolute value toward the object side;
the third lens group comprising at least two positive lenses and one negative lens; and
the imaging lens satisfying the following conditional formula.

$$0.80 < f/f2 < 3.00 \quad (1)$$

wherein f is the focal length of the entire system when focused on an object at an infinite distance, and f2 is the focal length of the second lens group.

Note that it is preferable for the following conditional formula to be satisfied.

$$0.90 < f/f2 < 2.50 \quad (1)'$$

In addition, it is more preferable for the following conditional formula to be satisfied.

$$1.00 < f/f2 < 2.10 \quad (1)''$$

It is preferable for the imaging lens of the present invention to satisfy the following conditional formulae.

$$80 < v12 \quad (2)$$

$$40 < v13 < 60 \quad (3)$$

$$80 < v14 \quad (4)$$

wherein v12 is the Abbe's number of the positive lens 12, v13 is the Abbe's number of the negative lens 13, and v14 is the Abbe's number of the positive lens 14.

In addition, it is preferable for the first lens group to further comprise a negative lens 15 having a concave surface with a radius of curvature having a small absolute value toward the image side, a positive lens 16 having a convex surface with a radius of curvature having a small absolute value toward the object side, and a negative lens 17 having a concave surface with a radius of curvature having a small absolute value toward the image side, provided in this order from the object side toward the image side of the positive lens 14.

In addition, it is preferable for the following conditional formulae to be satisfied.

$$60 < v15 \quad (5)$$

$$80 < v16 \quad (6)$$

wherein v15 is the Abbe's number of the negative lens 15, and v16 is the Abbe's number of the positive lens 16.

In addition, it is preferable for the negative lens 15 and the positive lens 16 to be cemented together.

It is preferable for the third lens group to substantially consist of a positive lens 31 having a convex surface with a radius of curvature having a small absolute value toward the image side, a biconcave negative lens 32, a biconvex positive lens 33, and a negative lens 34 having a concave surface with a radius of curvature having a small absolute value toward the object side, provided in this order from the object side.

An imaging apparatus of the present invention is characterized by being equipped with the imaging lens of the present invention described above.

The imaging lens of the present invention comprises: the first lens group having a positive refractive power which is fixed during focusing operations; the stop; the second lens group having a positive refractive power which moves during focusing operations; and the third lens group which is fixed during focusing operations, provided in this order from the object side. The first lens group comprises at least the positive lens 11 having a convex surface with a radius of curvature having a small absolute value toward the image side, the positive biconvex lens 12, the negative lens 13 having a concave surface with a radius of curvature having a small absolute value toward the object side, and the positive lens 14 having a convex surface with a radius of curvature having a small absolute value toward the object side. The second lens group comprises the positive lens 2 having a convex surface with a radius of curvature having a small absolute value toward the object side. The third lens group comprises at least two positive lenses and one negative lens. The imaging lens satisfies the conditional formula below. Therefore, a high performance imaging lens with a small F number can be realized, in which the weight of a focusing lens group (the second lens group) is reduced.

$$0.80 < f/f2 < 3.00 \tag{1}$$

In addition, the imaging apparatus of the present invention is equipped with the imaging lens of the present invention. Therefore, focusing operations can be performed at high speed, and further, bright videos having high image quality can be obtained.

BEST MODE FOR CARRYING OUT THE INVENTION

Figure 1:
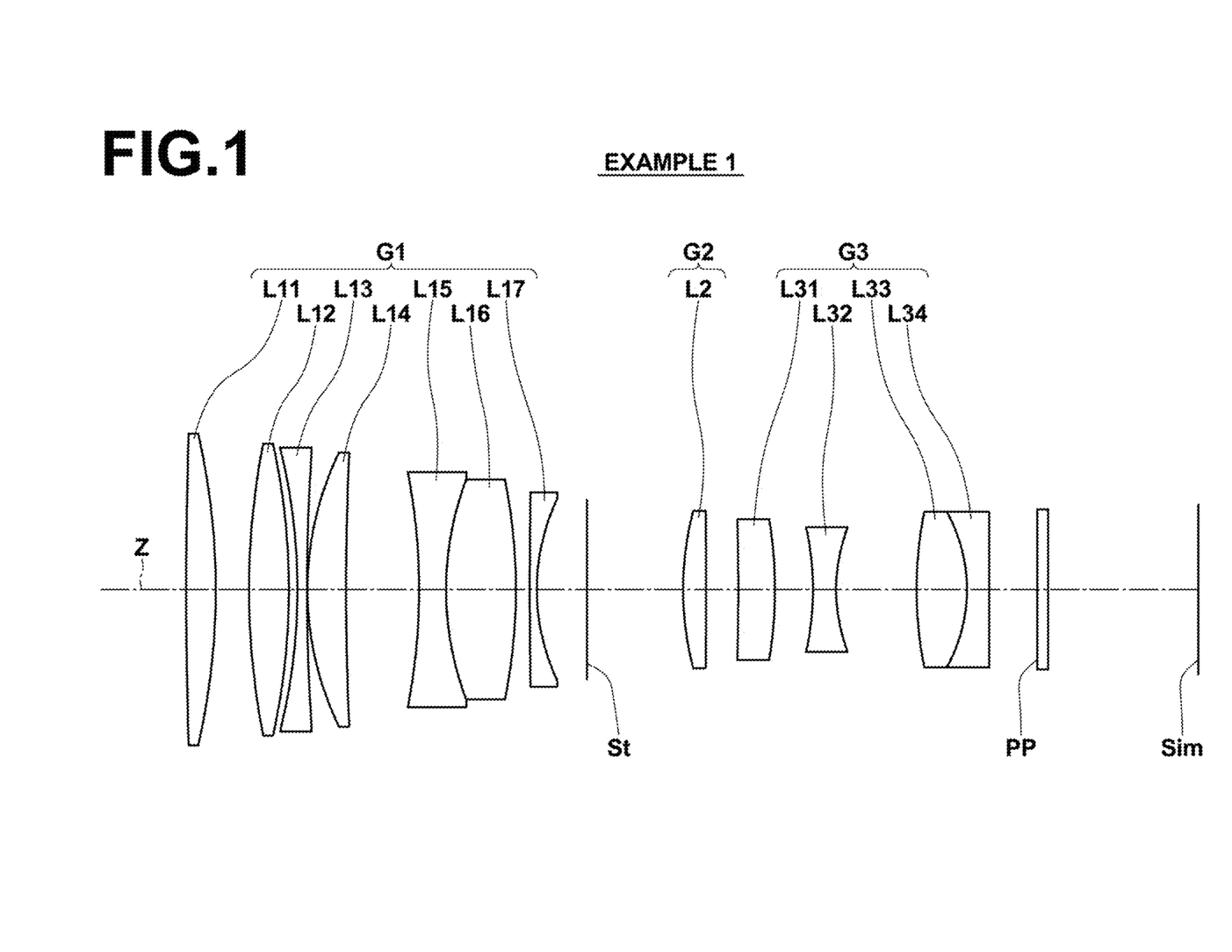
FIG. 1 is a sectional diagram that illustrates the lens configuration of an imaging lens according to an embodiment of the present invention (which is common with Example 1).

Hereinafter, embodiments of the present invention will be described in detail with reference to the attached drawings. FIG. 1 is a sectional diagram that illustrates the configuration of an imaging lens according to an embodiment of the present invention (which is common with that of Example 1). The example of the configuration illustrated in FIG. 1 is the same as the configuration of an imaging lens of Example 1 to be described later. In FIG. 1, the left side is the object side and the right side is the image side.

This imaging lens is constituted by a first lens group G1 having a positive refractive power which is fixed during focusing operations, an aperture stop St, a second lens group G2 having a positive refractive power that moves during focusing operations, and a third lens group G3 which is fixed during focusing operations, provided along an optical axis Z in this order from the object side. Note that the aperture stop St illustrated in FIG. 1 does not necessarily represent the size or the shape thereof, but the position thereof on the optical axis Z.

When this imaging lens is applied to an imaging apparatus, it is preferable for a cover glass for protecting the imaging surface of the imaging element and various filters, such as a low pass filter and an infrared cutoff filter to be provided between the optical system and an imaging surface Sim, according to the configuration of the camera on which the lens is mounted. FIG. 1 illustrates an example in which a plane parallel optical member PP is provided assuming the presence of the cover glass, the various types of filters, and the like between the third lens group G3 and the imaging surface Sim.

The first lens group G1 is constituted by a positive lens L11 having a convex surface with a radius of curvature having a small absolute value toward the image side, a positive biconvex lens L12, a negative lens L13 having a concave surface with a radius of curvature having a small absolute value toward the object side, a positive lens L14 having a convex surface with a radius of curvature having a small absolute value toward the object side, a negative lens L15 having a concave surface with a radius of curvature having a small absolute value toward the image side, a positive lens L16 having a convex surface with a radius of curvature having a small absolute value toward the object side, and a negative lens L17 having a concave surface with a radius of curvature having a small absolute value toward the image side, provided in this order from the object side.

Here, the positive lens L11 has the effect of decreasing variations in spherical aberration at far distances and at close distances. In addition, the combination of the three lenses, which are the positive lens L12, the negative lens L13, and the positive lens L14, has the effects of correcting spherical aberration and longitudinal chromatic aberration such that the amount of aberration is suppressed to a degree that can be borne even if the F number is small. In addition, the combination of the two lenses, which are the negative lens L15 and the positive lens L16 has the effect of correcting second order chromatic aberration. In addition, the negative lens L17 has the effect of shortening the total length of the lens system.

Note that the negative lens L15 and the positive lens L16 are cemented together. Thereby, generation of second order chromatic aberrations caused by fluctuations in distances among lenses during production can be suppressed.

In addition, the second lens group G2 is constituted by a positive lens L2 having a convex surface with a radius of curvature having a small absolute value toward the object side. The positive lens L2 has the effect of reducing variations in spherical aberration during focusing operations. In addition, by adopting a configuration in which the focusing lens group is constituted by a single lens, the weight of the focusing lens group can be reduced.

In addition, by moving the second lens group G2 to perform focusing operations and the first lens group G1 having a positive refractive power, axial rays of light that exit the first lens group G1 become converging rays of light, thereby enabling the diameter of the focusing lens to be small.

The third lens group G3 is constituted by a positive lens L31 having a convex surface with a radius of curvature having a small absolute value toward the image side, a biconcave negative lens L32, a biconvex positive lens L33, and a negative lens L34 having a concave surface with a radius of curvature having a small absolute value toward the object side, provided in this order from the object side. This configuration enables lateral chromatic aberration and astigmatism to be corrected. In addition, the biconvex positive lens L33 increases the refractive power of the entire system, therefore enabling a small F number to be obtained. Note that the positive lens L33 and the negative lens L34 may alternatively be a negative meniscus lens having a convex surface toward the object side and a positive lens having a convex surface with a radius of curvature having a small absolute value toward the object side, respectively.

In addition, the imaging lens according to the embodiment of the present invention is configured to satisfy Conditional Formula (1) below. Note that the imaging lens can achieve even faster focusing operations and less variation in aberrations during focusing operations, by satisfying Conditional Formula (1)' below, and further by satisfying Conditional Formula (1)" below.

$$0.80 < f/f2 < 3.00 \quad (1)$$

$$0.90 < f/f2 < 2.50 \quad (1)'$$

$$1.00 < f/f2 < 2.10 \quad (1)''$$

wherein f is the focal length of the entire system when focused on an object at an infinite distance, and f2 is the focal length of the second lens group.

If the value of f/f2 is less than the lower limit defined in Conditional Formula (1), the amount of movement of the focusing lens group will become excessively great. If the value of f/f2 is greater than the upper limit defined in Conditional Formula (1), the refractive power will become excessively strong, and variations in spherical aberration caused by focusing operations will become great.

In addition, the imaging lens according to the embodiment of the present invention is configured to satisfy Conditional Formulae (2) through (4) below.

$$80 < \nu 12 \quad (2)$$

$$40 < \nu 13 < 60 \quad (3)$$

$$80 < \nu 14 \quad (4)$$

wherein $\nu 12$ is the Abbe's number of the positive lens L12, $\nu 13$ is the Abbe's number of the negative lens L13, and $\nu 14$ is the Abbe's number of the positive lens L14.

If the values of $\nu 12$ and $\nu 14$ are less than the lower limits defined in Conditional Formulae (2) and (4), correction of longitudinal chromatic aberration will become difficult. In addition, if the value of $\nu 13$ is less than the lower limit defined in Conditional Formula (3), correction of second order aberration will become difficult, and if the value of $\nu 13$ is greater than the upper limit defined in Conditional Formula (3), correction of longitudinal chromatic aberration will become difficult.

In addition, the imaging lens according to the embodiment of the present invention is configured to satisfy Conditional Formulae (5) and (6) below.

$$60 < \nu 15 \quad (5)$$

$$80 < \nu 16 \quad (6)$$

wherein $\nu 15$ is the Abbe's number of the negative lens L15, and $\nu 16$ is the Abbe's number of the positive lens L16.

If the values of $\nu 15$ and $\nu 16$ are less than the lower limits defined in Conditional Formulae (5) and (6), correction of second order aberration will become difficult.

In the present imaging lens, it is preferable for glass to be employed as the material placed most toward the object side. Alternatively, a transparent ceramic may be employed.

In addition, in the case that the present wide angle lens is used in an environment in which the lens is likely to become damaged, it is preferable for a protective multilayer film coating to be administered. Further, an antireflective coating film may also be administered in order to reduce ghost light during use.

In addition, the example illustrated in FIG. 1 has been described as an example in which the optical member PP is provided between the lens system and the imaging surface Sim. Alternatively, various filters, such as a low pass filter and filters that cut off specific wavelength ranges, may be provided among each of the lenses. As a further alternative, coatings that have the same functions as the various filters may be administered on the surfaces of the lenses.

Next, numerical examples of the wide angle lens of the present invention will be described. Note that the numerical values shown in Tables 1 through 7 below and the aberration diagrams of FIGS. 4 through 9 are those which are normalized such that the focal length f of the entire lens system in a state focused on infinity is 1.

Figure 2:
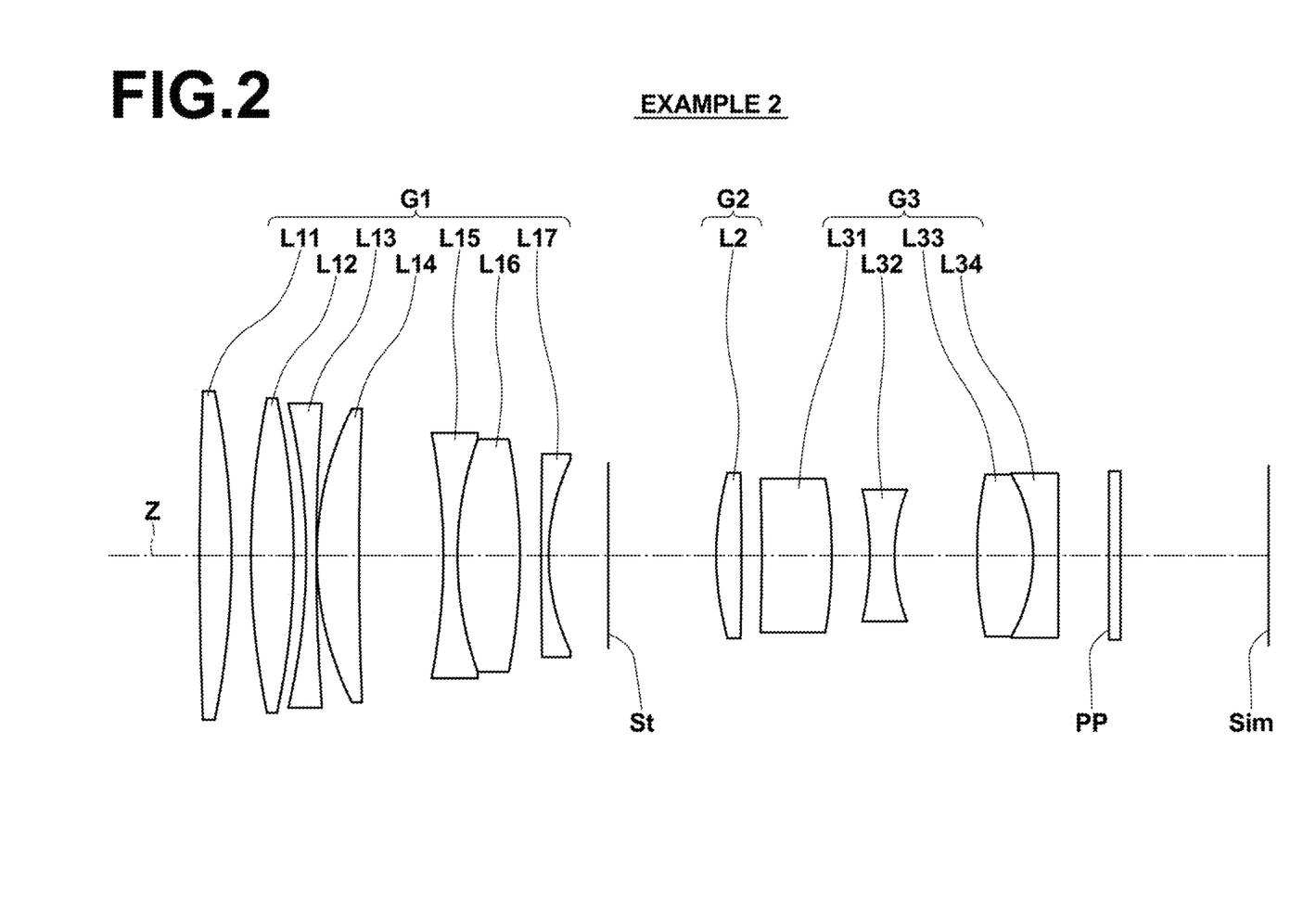
FIG. 2 is a sectional diagram that illustrates the lens configuration of an imaging lens according to Example 2 of the present invention.
Figure 3:
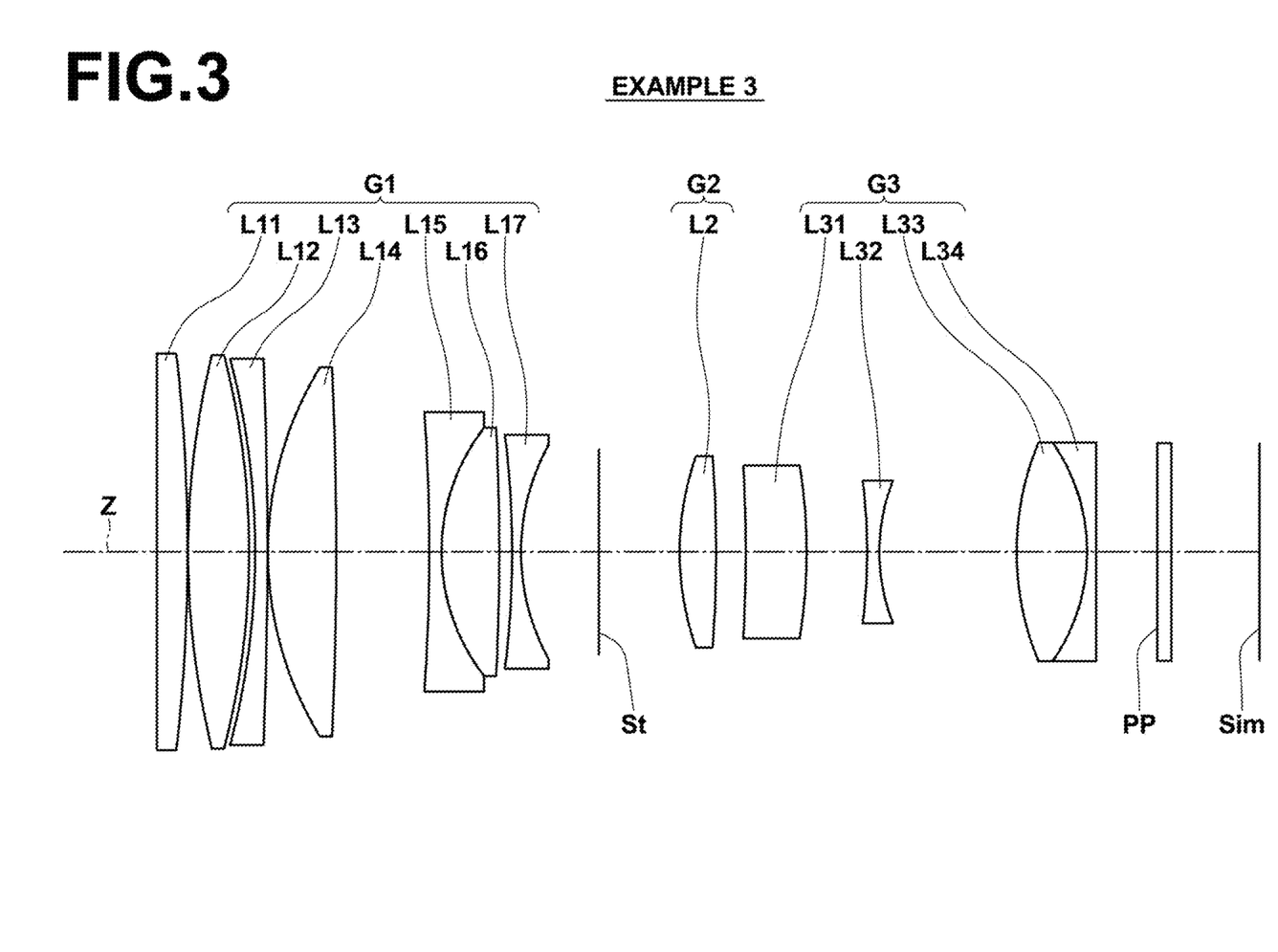
FIG. 3 is a sectional diagram that illustrates the lens configuration of an imaging lens according to Example 3 of the present invention.

FIG. 1 is a sectional diagram that illustrates the lens configuration of the zoom lens of Example 1. FIG. 2 is a sectional diagram that illustrates the lens configuration of the zoom lens of Example 2. FIG. 3 is a sectional diagram that illustrates the lens configuration of the zoom lens of Example 3. Note that in FIG. 1 through FIG. 3, the optical member PP is also illustrated, the left side is the object side, the right side is the image side, and the aperture stop St in the drawings do not necessarily represent the size or the shape thereof, but the position thereof along the optical axis Z.

Basic lens data of the imaging lens of Example 1 are shown in Table 1, and data related to various items are shown in Table 2. In addition, basic lens data of the imaging lens of Example 2 are shown in Table 3, and data related to various items are shown in Table 4. Further, basic lens data of the imaging lens of Example 3 are shown in Table 5, and data related to various items are shown in Table 6.

Hereinafter, the meanings of the symbols in the tables will be described for those of Example 1 as an example. The meanings of the symbols are basically the same for those of Examples 2 and 3.

In the lens data of Table 1, ith (i=1, 2, 3, . . . ) lens surface numbers that sequentially increase from the object side to the image side, with the lens surface at the most object side designated as first, are shown in the column Si. The radii of curvature of ith surfaces are shown in the column Ri, the distances between an ith surface and an i+1st surface along the optical axis Z are shown in the column Di. The refractive indices of jth (j=1, 2, 3, . . . ) optical elements that sequentially increase from the object side to the image side, with the optical element at the most object side designated as first, with respect to the d line (wavelength: 587.6 nm) are shown in the column Ndj. The Abbe's numbers of the jth optical element with respect to the d line are shown in the column νdj.

Note that the signs of the radii of curvature are positive in cases that the surface shape is convex toward the object side, and negative in cases that the surface shape is convex toward the image side. The aperture stop St, the optical member PP, and the imaging surface are also included in the basic lens data. Text reading "(stop)" is indicated along with a surface number in the column of the surface numbers at the surface corresponding to the aperture stop St. Similarly, text reading "imaging surface" is indicated along with a surface number in the column of the surface numbers at the surface corresponding to the imaging surface.

The values of the focal length f', the F number FNo., and the full angle of view 2ω are shown as data related to various items in Table 2.

Degrees are used as units of angles in the basic lens data and the data related to various items. However, the other values are normalized, and therefore no units are employed.

TABLE 1

Example 1: Lens Data (N and ν related to the d line)

| Si (Surface Number) | Ri (Radius of Curvature) | Di (Distance) | Ndi (Refractive Index) | νdj (Abbe's Number) |
|---|---|---|---|---|
| 1 | 6.298939 | 0.03506 | 1.51633 | 64.14 |
| 2 | -0.862653 | 0.03974 | | |
| 3 | 0.935377 | 0.04748 | 1.49700 | 81.54 |
| 4 | -0.827006 | 0.01015 | | |
| 5 | -0.722893 | 0.01143 | 1.77284 | 49.84 |
| 6 | 2.530705 | 0.00057 | | |
| 7 | 0.384480 | 0.04612 | 1.49700 | 81.54 |
| 8 | 3.829815 | 0.08686 | | |
| 9 | -0.752628 | 0.03224 | 1.48008 | 68.39 |
| 10 | 0.379980 | 0.08316 | 1.49700 | 81.54 |
| 11 | -0.676040 | 0.01651 | | |
| 12 | 8.467449 | 0.00847 | 1.47999 | 58.75 |
| 13 | 0.260695 | 0.05972 | | |
| 14 (stop) | ∞ | 0.11459 | | |
| 15 | 0.381278 | 0.02742 | 1.43875 | 94.93 |
| 16 | -8.056650 | 0.03842 | | |
| 17 | -2.674288 | 0.04362 | 1.83001 | 32.02 |
| 18 | -0.524911 | 0.04523 | | |
| 19 | -0.353760 | 0.02768 | 1.53416 | 48.59 |
| 20 | 0.212736 | 0.09580 | | |
| 21 | 0.478661 | 0.06010 | 1.71979 | 55.00 |
| 22 | -0.196185 | 0.02653 | 1.55259 | 45.14 |
| 23 | -104.478080 | 0.05714 | | |
| 24 | ∞ | 0.01314 | 1.51633 | 64.14 |
| 25 | ∞ | 0.17906 | | |
| 26 (imaging surface) | ∞ | | | |

TABLE 2

Example 1: Items (related to the d line)

| | |
|---|---|
| f' | 1.00 |
| FNo. | 2.67 |
| 2ω (°) | 11.6 |

TABLE 3

Example 2: Lens Data (N and ν related to the d line)

| Si (Surface Number) | Ri (Radius of Curvature) | Di (Distance) | Ndi (Refractive Index) | νdj (Abbe's Number) |
|---|---|---|---|---|
| 1 | 4.483355 | 0.03612 | 1.51633 | 64.14 |
| 2 | -0.951447 | 0.02216 | | |
| 3 | 0.911994 | 0.04845 | 1.49700 | 81.54 |
| 4 | -0.862875 | 0.01394 | | |
| 5 | -0.758797 | 0.01143 | 1.77250 | 49.60 |
| 6 | 2.358861 | 0.00057 | | |
| 7 | 0.376329 | 0.04778 | 1.49700 | 81.54 |
| 8 | 4.080145 | 0.09540 | | |
| 9 | -0.755944 | 0.01593 | 1.48749 | 70.23 |
| 10 | 0.399307 | 0.07083 | 1.49700 | 81.54 |
| 11 | -0.705602 | 0.02391 | | |
| 12 | 5.467318 | 0.00845 | 1.51823 | 58.90 |
| 13 | 0.256680 | 0.06728 | | |
| 14 (stop) | ∞ | 0.12233 | | |
| 15 | 0.357695 | 0.02856 | 1.43875 | 94.93 |
| 16 | -4.331607 | 0.02281 | | |
| 17 | -3.181219 | 0.07950 | 1.83400 | 37.16 |
| 18 | -0.523861 | 0.04279 | | |
| 19 | -0.346828 | 0.02805 | 1.51742 | 52.43 |
| 20 | 0.206569 | 0.09330 | | |
| 21 | 0.462404 | 0.06355 | 1.69680 | 55.53 |
| 22 | -0.186855 | 0.02857 | 1.54814 | 45.79 |
| 23 | 2147.483648 | 0.05713 | | |
| 24 | ∞ | 0.01314 | 1.51633 | 64.14 |
| 25 | ∞ | 0.16742 | | |
| 26 (imaging surface) | ∞ | | | |

TABLE 4

Example 2: Items (related to the d line)

| | |
|---|---|
| f' | 1.00 |
| FNo. | 2.65 |
| 2ω (°) | 11.6 |

TABLE 5

Example 3: Lens Data (N and ν related to the d line)

| Si (Surface Number) | Ri (Radius of Curvature) | Di (Distance) | Ndi (Refractive Index) | νdj (Abbe's Number) |
|---|---|---|---|---|
| 1 | ∞ | 0.02857 | 1.48749 | 70.23 |
| 2 | -1.714610 | 0.00057 | | |
| 3 | 0.796385 | 0.05710 | 1.49700 | 81.54 |
| 4 | -0.759012 | 0.00571 | | |
| 5 | -0.731945 | 0.01143 | 1.78800 | 47.37 |
| 6 | -4.617092 | 0.00057 | | |
| 7 | 0.341049 | 0.06397 | 1.49700 | 81.54 |
| 8 | -3.863065 | 0.08719 | | |
| 9 | -1.924876 | 0.01149 | 1.48749 | 70.23 |
| 10 | 0.194502 | 0.05408 | 1.49700 | 81.54 |
| 11 | -2.320804 | 0.01196 | | |
| 12 | -0.949617 | 0.00846 | 1.51742 | 52.43 |
| 13 | 0.213237 | 0.07295 | | |
| 14 (stop) | ∞ | 0.07574 | | |
| 15 | 0.279702 | 0.03409 | 1.43875 | 94.93 |
| 16 | -1.277792 | 0.02771 | | |
| 17 | -1.541299 | 0.05715 | 1.80000 | 29.84 |
| 18 | -0.509157 | 0.05665 | | |
| 19 | -0.567927 | 0.01143 | 1.69680 | 55.53 |
| 20 | 0.184689 | 0.12871 | | |
| 21 | 0.274803 | 0.06603 | 1.69680 | 55.53 |

TABLE 5-continued

Example 3: Lens Data (N and ν related to the d line)

| Si (Surface Number) | Ri (Radius of Curvature) | Di (Distance) | Ndi (Refractive Index) | νdj (Abbe's Number) |
|---|---|---|---|---|
| 22 | −0.183191 | 0.00857 | 1.67003 | 47.23 |
| 23 | 2147.483648 | 0.05715 | | |
| 24 | ∞ | 0.01314 | 1.51633 | 64.14 |
| 25 | ∞ | 0.08275 | | |
| 26 (imaging surface) | ∞ | | | |

TABLE 6

Example 3: Items (related to the d line)

| | |
|---|---|
| f | 1.00 |
| FNo. | 2.65 |
| 2ω (°) | 11.6 |

Table 7 shows values of the imaging lenses of Examples 1 through 3 corresponding to Conditional Formulae (1) through (6). Note that all of the Examples use the d line as a reference wavelength, and the values shown in Table 7 below are those for the reference wavelength.

TABLE 7

| Formula No. | Expression | Example 1 | Example 2 | Example 3 |
|---|---|---|---|---|
| (1) | f/f2 | 1.20399 | 1.32682 | 1.90079 |
| (2) | ν12 | 81.54 | 81.54 | 81.54 |
| (3) | ν13 | 49.84 | 49.60 | 47.37 |
| (4) | ν14 | 81.54 | 81.54 | 81.54 |
| (5) | ν15 | 68.39 | 70.23 | 70.23 |
| (6) | ν16 | 81.54 | 81.54 | 81.54 |

Figure 4:
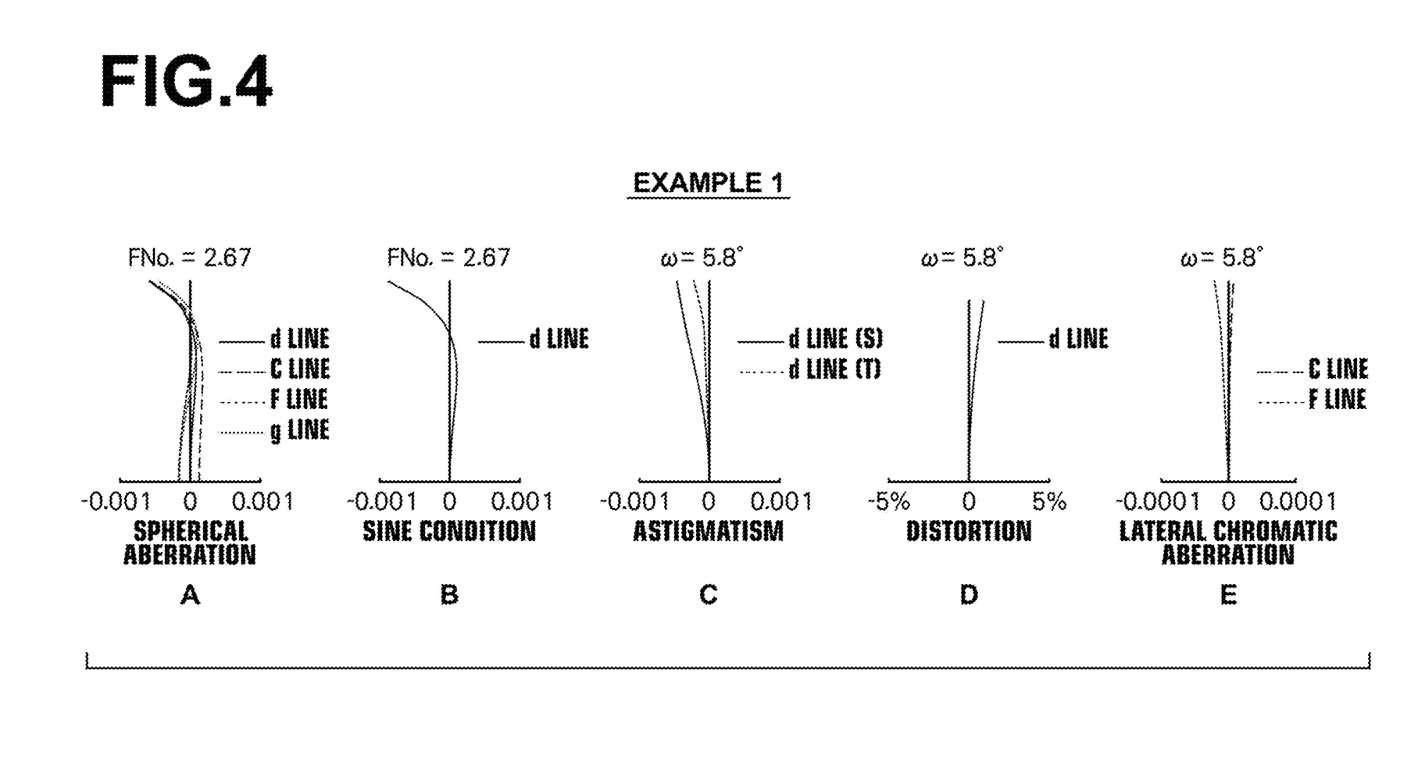
FIG. 4 is a collection of diagrams (A through E) that illustrate aberrations of the imaging lens of Example 1.

A through E of FIG. 4 are diagrams that illustrate various aberrations of the imaging lens of Example 1. A through E of FIG. 4 respectively illustrate spherical aberration, offense against the sine condition, astigmatism, distortion, and lateral chromatic aberration.

The aberration diagrams that illustrate spherical aberration, astigmatism, and distortion show aberrations related to the d line (wavelength: 587.6 nm). The diagrams that illustrate spherical aberration and lateral chromatic aberration show aberrations related to the d line (wavelength: 587.6 nm), the C line (wavelength: 656.3 nm), the F line (wavelength: 486.1 nm) and the g line (wavelength: 435.8 nm) with a solid line, a long broken line, a short broken line, and a gray line, respectively. In the diagram that illustrates astigmatism, aberrations in the sagittal direction and in the tangential direction are shown with a solid line and a broken line, respectively. In the diagram that illustrates spherical aberration, "FNo." Denotes the F number, and in the other diagrams, ω denotes the half angle of view.

Figure 5:
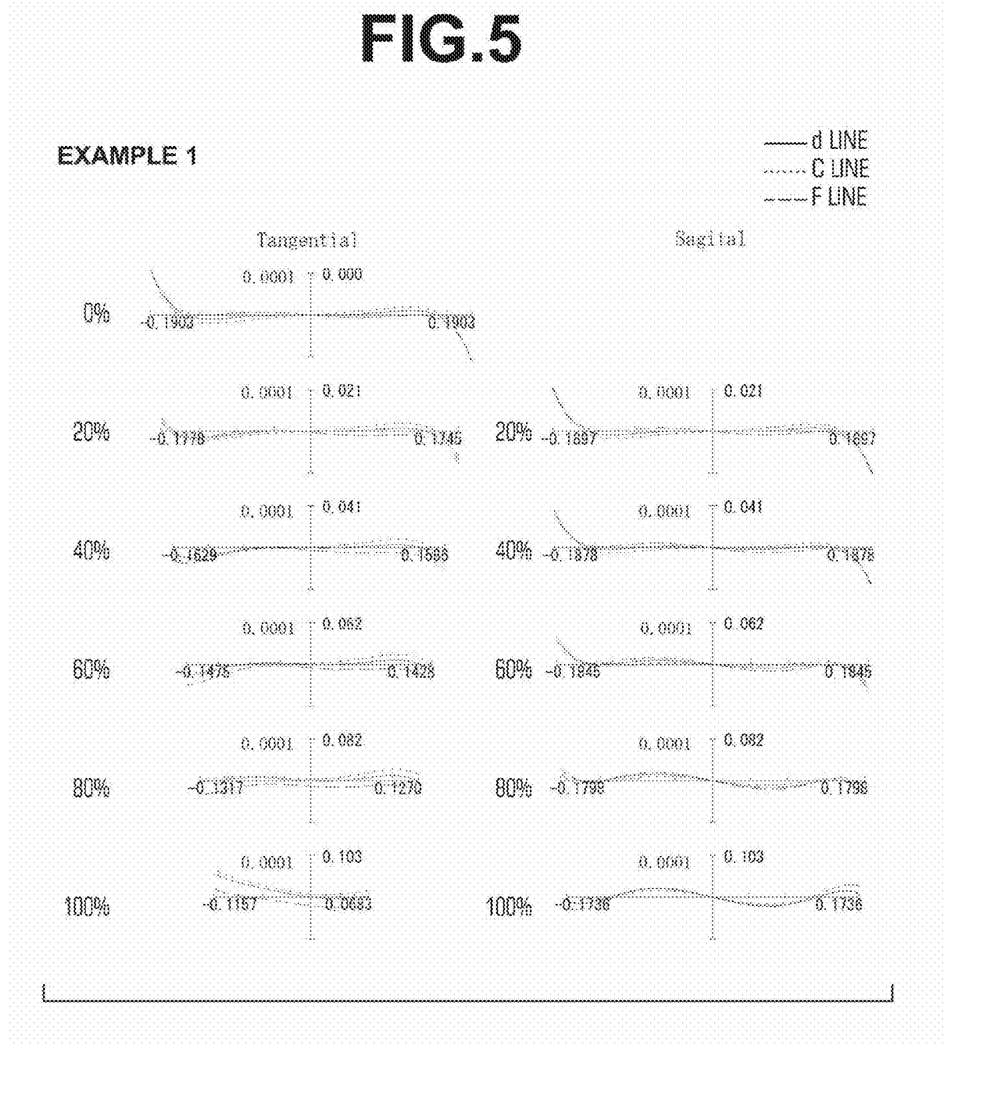
FIG. 5 is a collection of diagrams that illustrate lateral aberrations of the imaging lens of Example 1.

In addition, lateral aberration diagrams of the imaging lens of Example 1 are shown in FIG. 5.

The diagrams that illustrate lateral aberration show aberrations related to the d line (wavelength: 587.6 nm), the C line (wavelength: 656.3 nm), and the F line (wavelength: 486.1 nm) with solid lines, short broken lines, and long broken lines, respectively.

Figure 6:
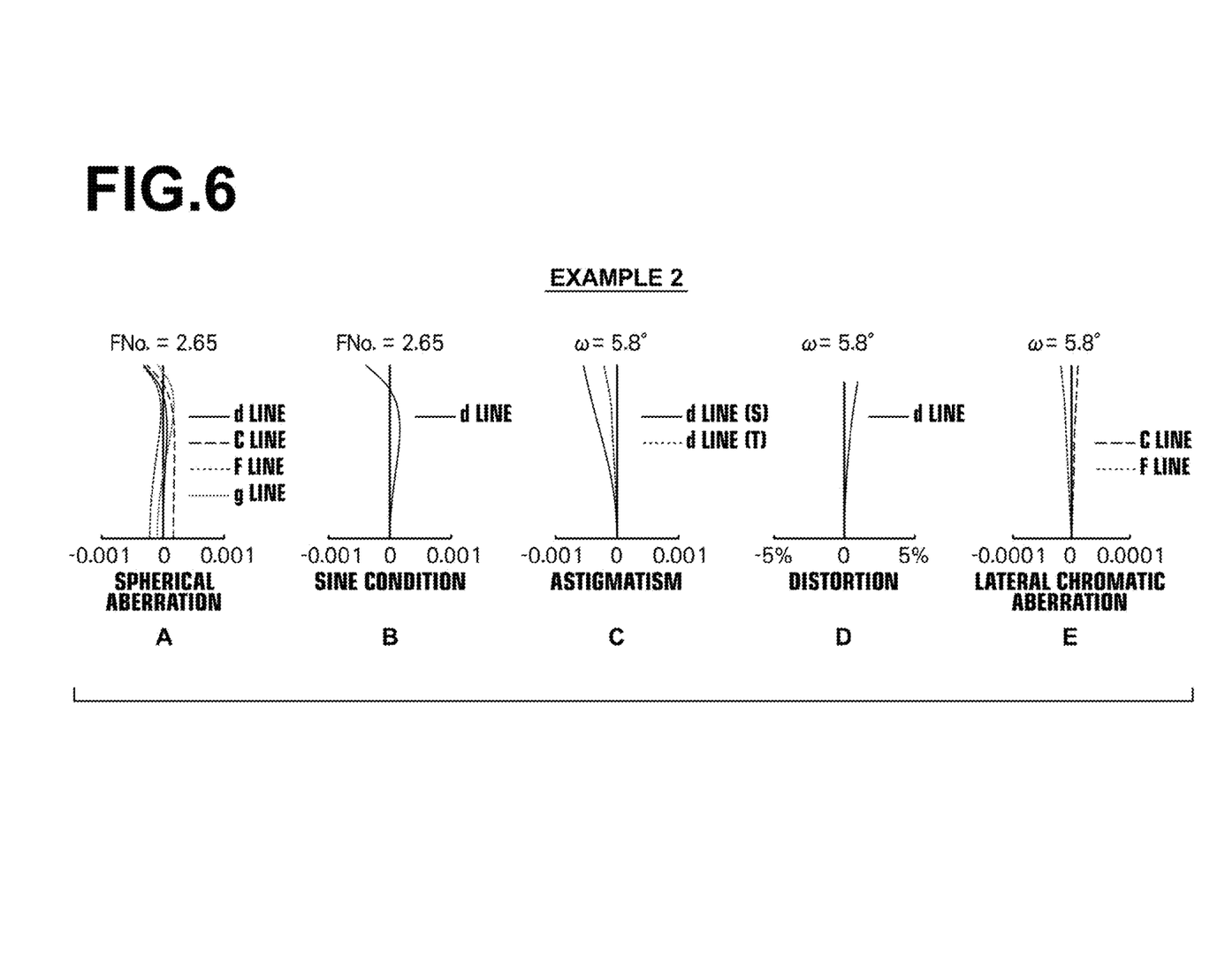
FIG. 6 is a collection of diagrams (A through E) that illustrate aberrations of the imaging lens of Example 2.
Figure 7:
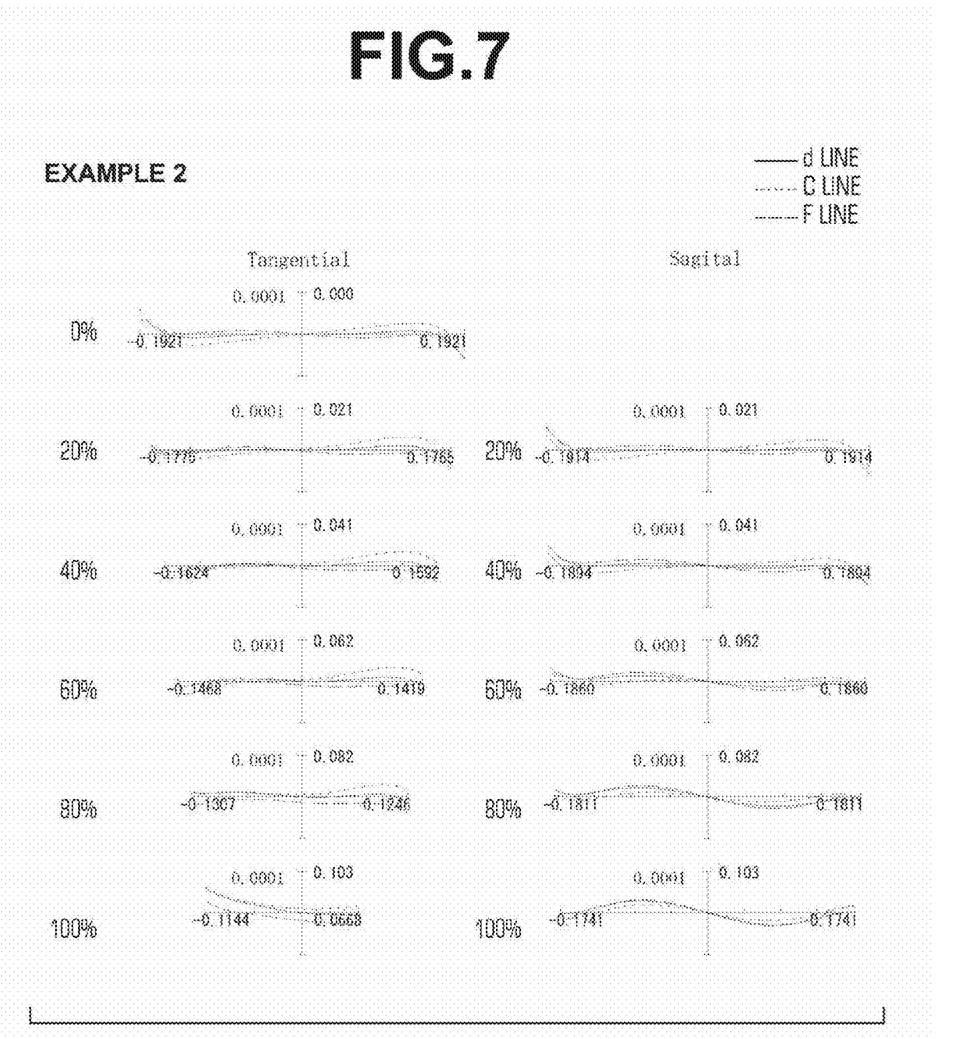
FIG. 7 is a collection of diagrams that illustrate lateral aberrations of the imaging lens of Example 2.

Similarly, various aberrations of the imaging lens of Example 2 are shown in A through E of FIG. 6, and lateral aberrations of the imaging lens of Example 2 are shown in FIG. 7.

Figure 8:
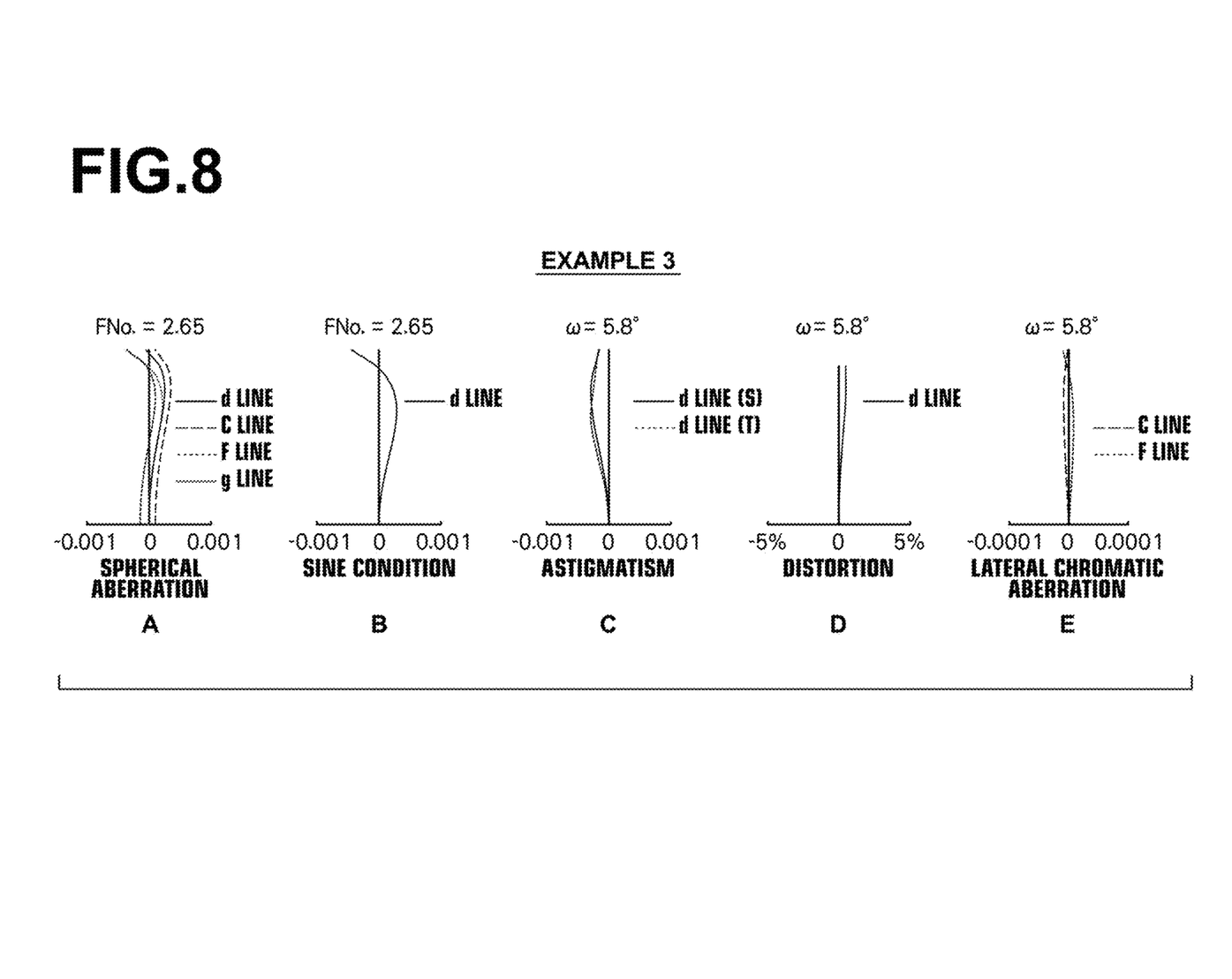
FIG. 8 is a collection of diagrams (A through E) that illustrate aberrations of the imaging lens of Example 3.
Figure 9:
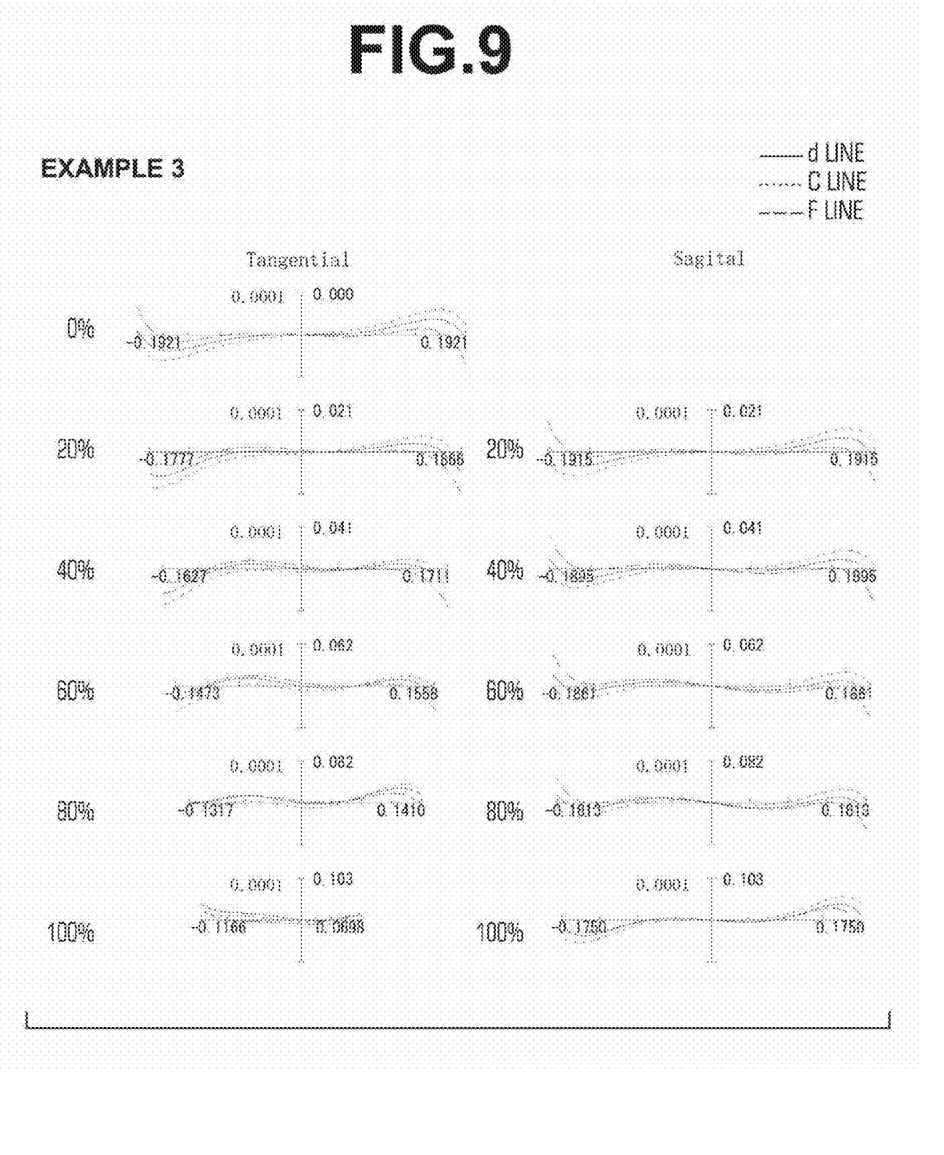
FIG. 9 is a collection of diagrams that illustrate lateral aberrations of the imaging lens of Example 3.

In addition, various aberrations of the imaging lens of Example 3 are shown in A through E of FIG. 8, and lateral aberrations of the imaging lens of Example 3 are shown in FIG. 9.

From the above data, it can be understood that all of the imaging lenses of Examples 1 through 3 satisfy Conditional Formulae (1) through (6), and that all of the imaging lenses of Examples 1 through 3 are high performance imaging lenses with small F numbers, in which the focusing lens groups (the second lens groups G2) are lightweight.

Figure 10:
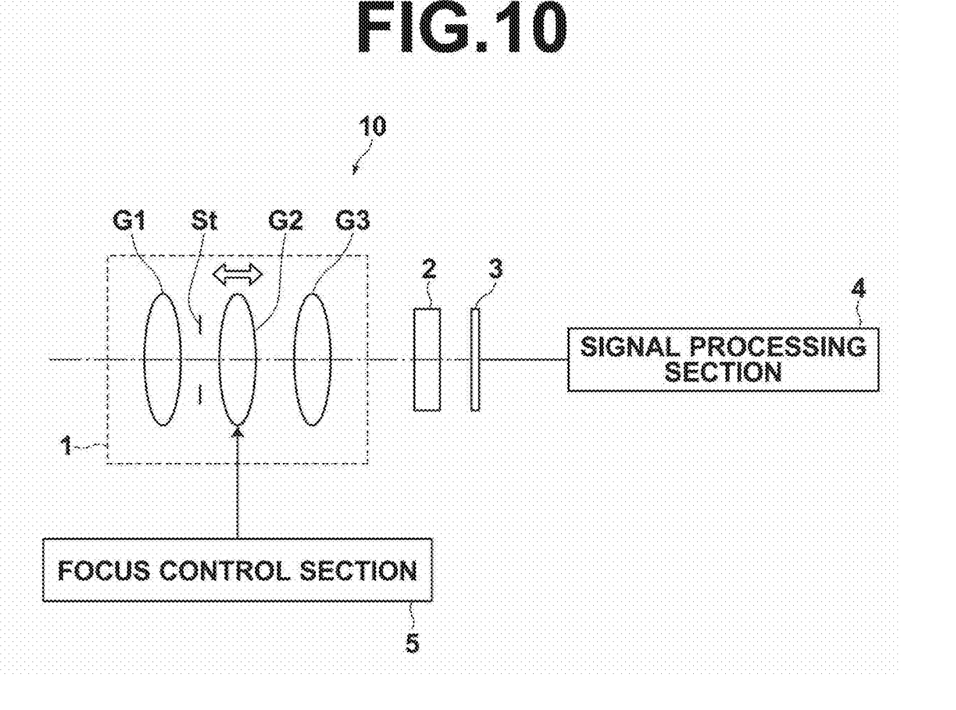
FIG. 10 is a diagram that schematically illustrates the configuration of an imaging apparatus according to an embodiment of the present invention.

Next, an imaging apparatus according to an embodiment of the present invention will be described. FIG. 10 is a diagram that schematically illustrates the configuration of an imaging apparatus that employs a wide angle lens according to an embodiment of the present invention, as an example of an imaging apparatus according to an embodiment of the present invention. Examples of such an imaging apparatus include a video camera and an electronic still camera that employs a solid state imaging element such as a CCD and a CMOS as a recording medium.

The imaging apparatus 10 illustrated in FIG. 10 is equipped with an imaging lens 1, a filter 2 provided toward the image side of the imaging lens 1, an imaging element 3 that captures images of subjects imaged by the imaging lens, a signal processing section 4 that administers computation processes on signals output from the imaging element 3, and a focus control section 5 that performs focus adjustments of the imaging lens 1.

The imaging lens 1 is constituted by a first lens group G1 having a positive refractive power which is fixed during focusing operations, an aperture stop St, a second lens group G2 having a positive refractive power and which moves during focusing operations, and a third lens group G3 which is fixed during focusing operations, provided in this order from the object side.

FIG. 10 illustrates each of the lens groups in a schematic manner. The imaging element 3 captures images of subjects formed by the imaging lens 1 and converts the images into electrical signals. An imaging surface of the imaging element 3 is positioned to match an image formation plane of the imaging lens. A CCD, a CMOS, or the like may be employed as the imaging element 3.

The present invention has been described with reference to the embodiments and Examples thereof. However, the present invention is not limited to the embodiments and Examples described above, and various modifications are possible. For example, the values of the radii of curvature of each lens component, the distances among surfaces, the refractive indices, the Abbe's numbers, etc., are not limited to the numerical values indicated in connection with the Examples, and may be other values.

What is claimed is:

1. An imaging lens, comprising:
a first lens group having a positive refractive power which is fixed during focusing operations;
a stop;
a second lens group having a positive refractive power which moves during focusing operations; and
a third lens group which is fixed during focusing operations, provided in this order from the object side;
the first lens group comprising at least a positive lens 11 having a convex surface with a radius of curvature having a small absolute value toward the image side, a positive biconvex lens 12, a negative lens 13 having a concave surface with a radius of curvature having a small absolute value toward the object side, and a positive lens 14 having a convex surface with a radius of curvature having a small absolute value toward the object side, provided in this order from the object side;

the second lens group comprising a positive lens 2 having a convex surface with a radius of curvature having a small absolute value toward the object side;

the third lens group comprising at least two positive lenses and one negative lens; and the imaging lens satisfying the following conditional formula:

$$0.80 < f/f2 < 3.00 \quad (1)$$

wherein f is the focal length of the entire system when focused on an object at an infinite distance, and f2 is the focal length of the second lens group.

2. An imaging lens as defined in claim 1 that satisfies the following conditional formula:

$$0.90 < f/f2 < 2.50 \quad (1)'$$

3. An imaging lens as defined in claim 2 that satisfies the following conditional formula:

$$1.00 < f/f2 < 2.10 \quad (1)''$$

4. An imaging lens as defined in claim 1 that satisfies the following conditional formulae:

$$80 < \nu 12 \quad (2)$$

$$40 < \nu 13 < 60 \quad (3)$$

$$80 < \nu 14 \quad (4)$$

wherein $\nu 12$ is the Abbe's number of the positive lens 12, $\nu 13$ is the Abbe's number of the negative lens 13, and $\nu 14$ is the Abbe's number of the positive lens 14.

5. An imaging lens as defined in claim 1, wherein:

the first lens group further comprises a negative lens 15 having a concave surface with a radius of curvature having a small absolute value toward the image side, a positive lens 16 having a convex surface with a radius of curvature having a small absolute value toward the object side, and a negative lens 17 having a concave surface with a radius of curvature having a small absolute value toward the image side, provided in this order from the object side toward the image side of the positive lens 14.

6. An imaging lens as defined in claim 5 that satisfies the following conditional formulae:

$$60 < \nu 15 \quad (5)$$

$$80 < \nu 16 \quad (6)$$

wherein $\nu 15$ is the Abbe's number of the negative lens 15, and $\nu 16$ is the Abbe's number of the positive lens 16.

7. A telephoto lens as defined in claim 5, wherein:

the negative lens 15 and the positive lens 16 are cemented together.

8. An imaging lens as defined in claim 1, wherein:

the third lens group comprises a positive lens 31 having a convex surface with a radius of curvature having a small absolute value toward the image side, a biconcave negative lens 32, a biconvex positive lens 33, and a negative lens 34 having a concave surface with a radius of curvature having a small absolute value toward the object side, provided in this order from the object side.

9. An imaging apparatus equipped with an imaging lens defined in claim 1.

\* \* \* \* \*